(12) United States Patent
Dawson et al.

(10) Patent No.: US 9,277,490 B2
(45) Date of Patent: Mar. 1, 2016

(54) SYSTEM AND METHOD OF LOCATING WIRELESS CONNECTION AMONG A PLURALITY OF WIRELESS CONNECTIONS

(75) Inventors: Christopher J. Dawson, Arlington, VA (US); Peter G. Finn, Brampton (CA); Rick A. Hamilton, II, Charlottesville, VA (US); Jenny S. Li, Danbury, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1315 days.

(21) Appl. No.: 11/842,757

(22) Filed: Aug. 21, 2007

(65) Prior Publication Data

US 2009/0054061 A1    Feb. 26, 2009

(51) Int. Cl.
*H04W 36/00*    (2009.01)
*H04W 48/18*    (2009.01)

(52) U.S. Cl.
CPC ..................... *H04W 48/18* (2013.01)

(58) Field of Classification Search
CPC ............ H04W 48/18; H04W 36/0066; H04W 28/0236; H04W 28/18; H04W 36/14; H04W 36/24; H04W 36/30; H04W 40/12; H04W 48/16; H04W 48/20; H04W 72/1226; H04W 92/02; H04L 5/006

USPC .................................. 455/442; 370/331, 338
See application file for complete search history.

(56) References Cited

U.S. PATENT DOCUMENTS

| | | | |
|---|---|---|---|
| 6,889,385 B1 | 5/2005 | Rakib et al. | |
| 6,993,398 B2 | 1/2006 | Li et al. | |
| 2004/0122952 A1* | 6/2004 | Kistler et al. | 709/227 |
| 2004/0176905 A1* | 9/2004 | Sanqunetti et al. | 701/200 |
| 2005/0071476 A1* | 3/2005 | Tejaswini et al. | 709/227 |
| 2005/0076087 A1 | 4/2005 | Budd et al. | |
| 2005/0176420 A1* | 8/2005 | Graves et al. | 455/424 |
| 2005/0198368 A1 | 9/2005 | Fleming et al. | |
| 2005/0233749 A1* | 10/2005 | Karaoguz et al. | 455/442 |
| 2006/0026268 A1 | 2/2006 | Sanda | |
| 2006/0179129 A1 | 8/2006 | Clayton et al. | |

* cited by examiner

*Primary Examiner* — Quan M Hua
(74) *Attorney, Agent, or Firm* — John Pivnichny; Andrew M. Calderon; Roberts Mlotkowski Safran & Cole, P.C.

(57) ABSTRACT

A system and method of locating a wireless connection among a plurality of possible wireless connections. More particularly, a system and method of locating a user preferred wireless connection among a plurality of possible wireless connections. The method includes scanning for available networks and determining whether the available networks satisfy one or more user preferences. The method further includes establishing a secondary network connection with one of the available networks based on one or more user preferences being satisfied.

8 Claims, 3 Drawing Sheets

SYSTEM AND METHOD OF LOCATING WIRELESS CONNECTION AMONG A PLURALITY OF WIRELESS CONNECTIONS

FIELD OF THE INVENTION

The invention generally relates to a system and method of locating a wireless connection among a plurality of possible wireless connections and, more particularly, to a system and method of locating a wireless connection among a plurality of possible wireless connections based on a user preference.

BACKGROUND OF THE INVENTION

Mobile computing is becoming increasingly pervasive, and will approach ubiquity in wireless devices (e.g., notebook computers, smart phones, personal digital assistants (PDAs), etc.) over the next decade. One consistent trend in this mobile computing space is the fact that such platforms increasingly communicate over a variety of wireless protocols. Common protocols in use today for wireless data transfer include EV-DO, IEEE 802.11a/b/g, ZigBee® (registered trademark of ZIGBEE ALLIANCE of California), Bluetooth® (registered trademark of BLUETOOTH SIG, INC. of Delaware), and many other related protocols. By their very nature, differentials do exist, and will continue to exist, between the speed, or bandwidth, with which mobile devices can communicate with each other, vis-à-vis communications speeds with the broader network where a device's target data may reside.

It is often the case that a wireless device will have a relatively fast wireless connection to other local devices and a relatively slow wireless connection to the broader network (e.g., the Internet). For example, local wireless connections, provided by protocols such as IEEE 802.11a, 802.11b, 802.11g, 802.15.1 (e.g., Bluetooth®), and 802.15.4 (e.g., Zigbee®) provide fast data transfer rates of about 3 to 54 megabits per second (Mbps). However, such transfer protocols often have a limited maximum transmission range of about 30 to 300 ft. On the other hand, wireless telephony protocols (e.g., EV-DO, CDMA, EDGE, GPRS, etc.) have relatively large maximum transmission ranges on the order of miles, but only provide data transfer rates of about 10 kilobits per second (kbps) to 1 Mbps. Thus, while a user of a mobile device may enjoy relatively fast data transfer amongst local devices, the user is often limited to a slow wireless connection to the outside world (e.g., the Internet).

However, unless mechanisms exist to motivate network nodes (and their owners) to lend their excess bandwidth at any given moment, it may be difficult for borrowers to obtain the bandwidth needed for any given download.

Accordingly, there exists a need in the art to overcome the deficiencies and limitations described hereinabove.

SUMMARY OF THE INVENTION

In a first aspect of the invention, a method comprises scanning for available networks and determining whether the available networks satisfy one or more user preferences. The method further comprises establishing a secondary network connection with one of the available networks based on one or more user preferences being satisfied.

In another aspect of the invention, a method is provided for establishing a secondary network connection. The method comprises providing a computer infrastructure operable to scan for available networks, establish a secondary network connection with one of the available networks which satisfy a predetermined user defined criteria and disconnect a primary network connection after the secondary network connection is established.

In still another aspect of the invention, a computer program product comprises a computer usable medium having readable program code embodied in the medium. The computer program product includes at least one component to provide the processes of the invention.

DETAILED DESCRIPTION OF EMBODIMENTS OF THE INVENTION

The invention generally relates to a system and method of locating a wireless connection among a plurality of possible wireless connections and, more particularly, locating a preferred wireless network, e.g., least expensive, most reliable, wireless connection, among a plurality of possible wireless connections. The present invention can be implemented in either a peer-to-peer environment or a multiplexed environment.

By implementing the system and methods of the invention it is possible to connect to the least expensive or most reliable network connection. Alternatively, it is possible to connect to a preferred network, based on other user defined variables. In one implementation, it is possible to automatically find the least expensive wireless connection for wireless users, using multi-homed wireless interfaces on portable devices.

As an example, a user may not be aware of all connection options once connected via a particular network connection, e.g., 802.11x and cellular based connections. In this illustrative example, the user may wander into a free wireless connection site at which time, implementing the system and methods of the invention, the connection will automatically be switched to the free connection to minimize connection costs. In embodiments, the user will be notified of the less expensive connection, providing the user the opportunity to switch connections to the less expensive connection. The user may also be notified or automatically connected to a most reliable or other preferred network, based on empirical data.

System Environment

Figure 1:
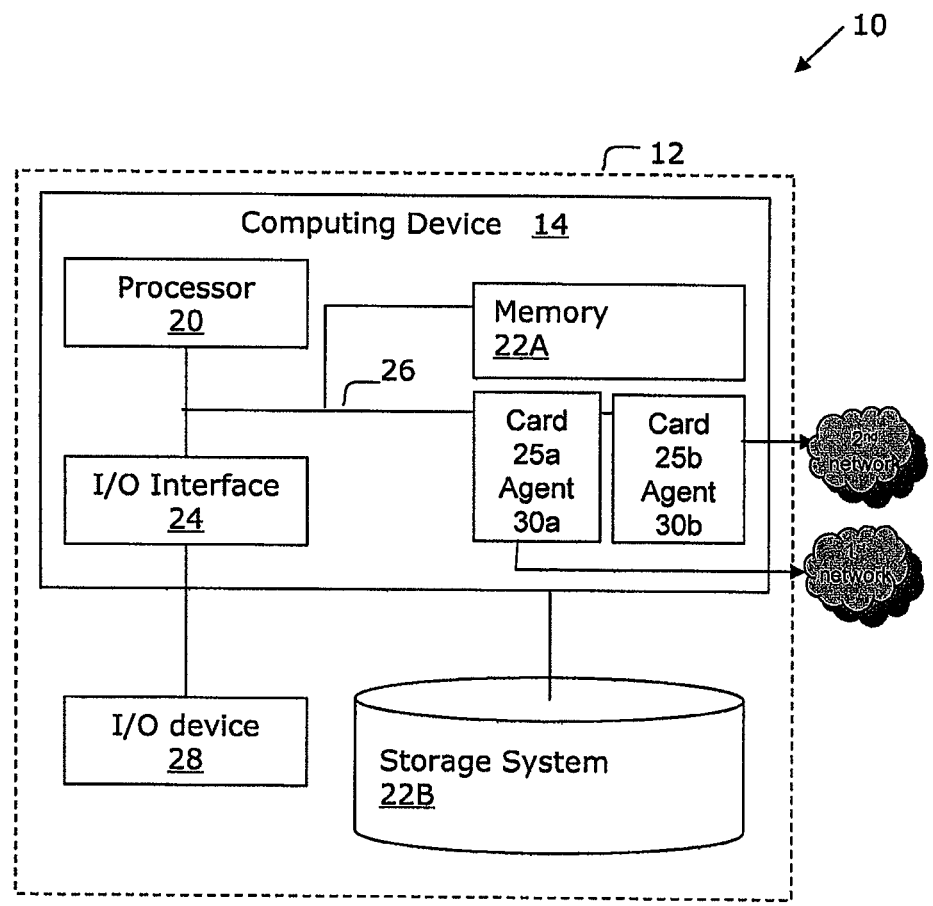
FIG. 1 shows an illustrative environment for implementing the processes in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a primary wireless network interface card 25a and a secondary wireless network interface card 25b. The computing device 14 can conceivably include more than two wireless network interface cards (NIC). It should be understood that the wireless network interface cards could be "logical" in that a single physical device can perform the functions performed by the separate cards. The computing device 14 may be representative of any portable device such as, for example, a portable digital assistant, a laptop computer, cellular telephone, etc.

The primary wireless network interface card 25a serves as the interface card for the device's primary connection; whereas, the wireless network interface card 25b serves as the interface card for the device's secondary connection. In embodiments, the secondary network connection is the least expensive network connection, most reliable network connection or a preferred network connection. As should be understood by those of skill in the art, more than two wireless connections may be provided using additional wireless network interface cards or their equivalent logical functions. Although the wireless network interface cards can be equivalent logical functions, the discussion herein will refer to separate wireless network interface cards for ease of discussion.

Each of the interface cards 25a and 25b include agents 30a and 30b, respectively, which makes computing device 14 operable to establish the least expensive network connection, a preferred network connection, and/or a most reliable network connection, etc., e.g., the processes described herein. In embodiments, the agents 30a and 30b are programmed to periodically scan, e.g., every few seconds, for network connections meeting the user's criteria. These criteria may include scanning for the least expensive network, a most reliable network, or other user preferred network type connections.

The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution. Further, the computing device 14 is in communication with an external I/O device/resource 28 and a storage system 22B. The external I/O device/resource 28 may be keyboards, displays, pointing devices, etc. The I/O device/resource 28 may be configured to show a network table or provide user notifications, as discussed in greater detail below.

In general, the processor 20 executes computer program code, which is stored in memory 22A and/or storage system 22B or preferably in a memory of each of the agents 30a and 30b to implement the processes described herein. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The computing device 14 can comprise any general purpose computing article of manufacture capable of executing computer program code installed thereon (e.g., a laptop computer, handheld device, etc.). However, it is understood that the computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

By way of example, the service provider may create, maintain, support and provide a network history table to a potential user with price offering information in accordance with different networks. The table, for example, can be downloaded on a predetermined basis, upon scanning for a network, in accordance with the preset invention.

Wireless Connection

Figure 2:
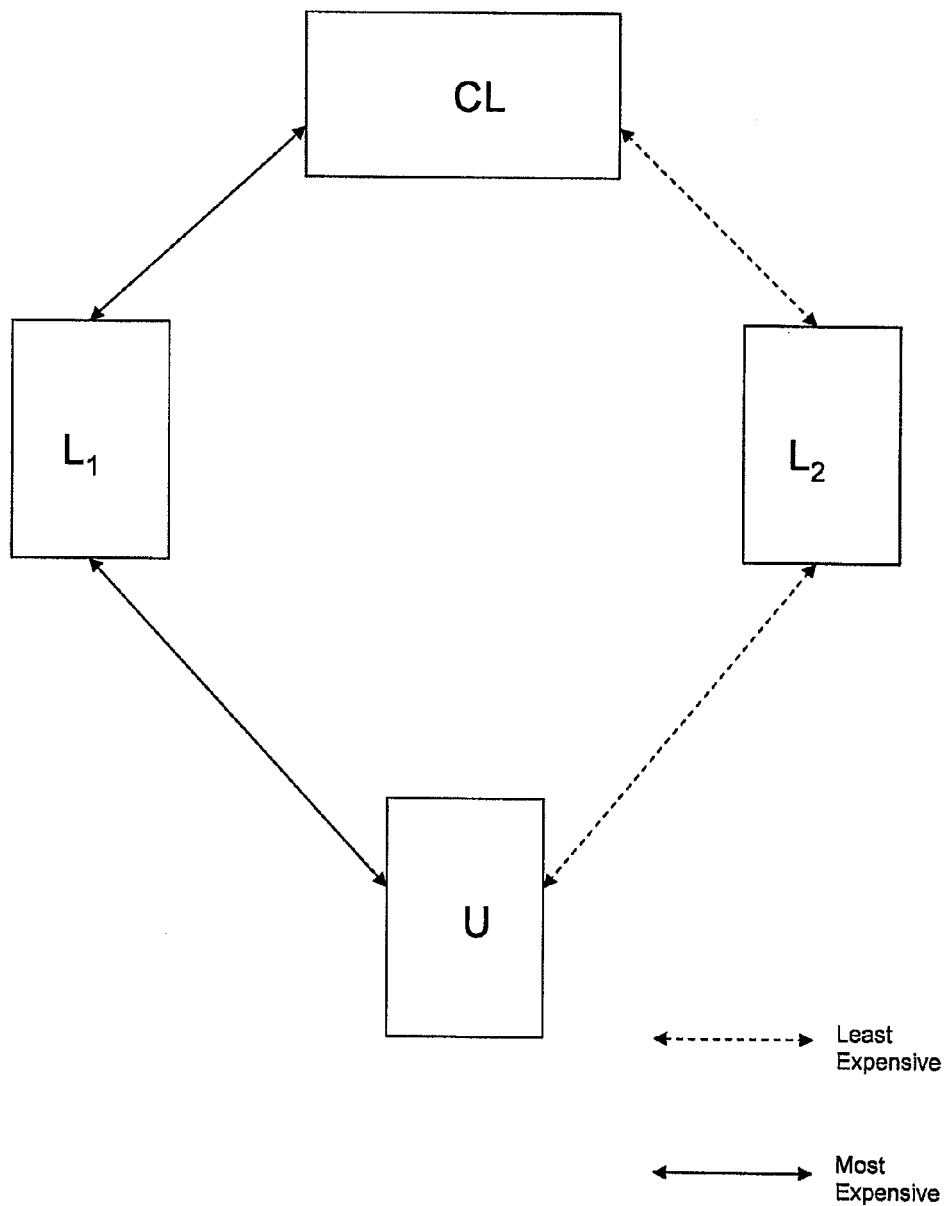
FIG. 2 is an overview of a network connection in accordance with the invention.

FIG. 2 is a general overview of an exemplary wireless connection in accordance with the invention. As shown in FIG. 2, user "U" requests information, e.g., transfer of files, from a central location, CL (or distributed locations). To connect to the central location, CL, the user "U" may scan for wireless networks via the agent (e.g., associated with the wireless network interface cards (NIC) on the user's portable device).

In the example of FIG. 2, the user is currently connected to wireless network $L_1$ via any known wireless protocol. In addition, the user's device begins to scan for other networks. In this example, the user's device finds wireless network $L_2$. The user can connect to the wireless network $L_2$ via any known wireless protocol. In this example, the user "U" will connect to the least expensive of the wireless networks, $L_2$, in order to connect to the central location, CL (or distributed locations). Prior to connecting to the wireless network $L_2$, the user maintains connection to the wireless network $L_1$, which is more expensive than that wireless network connection to $L_2$.

In embodiments, the user can typically find multiple wireless networks and may connect to one of the wireless networks using various rules. These rules include, for example, (i) random selection, (ii) selection based on descending order within a table, and/or (iii) previously used networks that are reliable and inexpensive.

In the random selection mode (i), the user can randomly select a network from a result list of the scan. In the descending order mode (ii), the user can select a network listed in a result table, resulting from the scan for wireless networks. In this scenario, the wireless networks that are within close proximity with the user or which have stronger wireless signals will appear on the top of the list. With this assumption, it is logical for the user (via an agent) to connect with the first listed network and, if the connection is not acceptable, the user will connect to other networks, in a descending order.

In option (iii), the agent may select a network which was used by the user in the past. This network would preferably be a most reliable and inexpensive network with reference to other networks. In option (iii), the network may be evidenced as the most reliable by using established, empirical patterns indicating no or few "drop-offs."

In the implementation of option (iii), the user may have access to a history table that lists previously used networks. The agent would use this history table, once a scan is made and a determination as to which networks are available, to select the most reliable and/or inexpensive network. A sample table is shown below in Table 1. (Table 1 may also be representative of a table used in any of the above options).

For purposes of option (iii), Table 1 provides the past results for nearby wireless networks. It is understood that the below table is one example and that the table may take other formats, request additional information, etc.

TABLE 1

Network Connection History Table

| Network Name | Wireless Mode | MAC Address | Encryption | Price | isReliable |
|---|---|---|---|---|---|
| Linksys-g | 802.11g | 00-06-25-CC-00-00 | Disabled | Free | Yes |
| BTKing | 802.11g | 00-12-10-99-2C-42 | Disabled | Free | No |
| Cafe123 | 802.11g | 00-14-99-53-24-1C | Disabled | $0.10 per minute | Yes |

In the above table, the "Network Name" column shows the unique identifier of a network. For example, this could be a hostname, a Bluetooth® name or any other information that can uniquely describe the network. The "Wireless Mode" column describes the actual connection type. The "MAC address" column shows an IP address or any other attribute that can be used to locate the network. The "Encryption" column may be used to indicate whether the network is encryption enabled or disabled.

The "Price" column specifies the recorded price that the user paid in the past for a given connection. The price may be stated in a price/data volume, a price/time, a price/data volume, a price/time, a price/time with a data cap, or a one-time price. Additionally, the price may be stated as a number of minutes to be used in a wireless service plan or any other charging mechanism. The column "isReliable" indicates whether the wireless network is reliable based on the existence of any network drop-offs during the previous connection(s).

Based on predefined rules, the agent can check if the name of the least expensive and reliable wireless network from the historical list appears in the current scan list. If so, it may be selected. If not, the agent will look at the next inexpensive and reliable network from the list.

In one illustrative example, a user may generate the table by clicking on an icon, and when prompted, make a network selection. The user's device could generate any portions of the information in the table, upon scanning for connections. Also, the user may be notified of the existence of the table or change the network connection via an audible or visual alert. Once alerted, the agent can automatically select an appropriate network connection. Alternatively, the user can manually select an appropriate connection via a scrolling action, or other selection mode well known to those of skill in the art.

Processes in Accordance with the Invention

Figure 3:
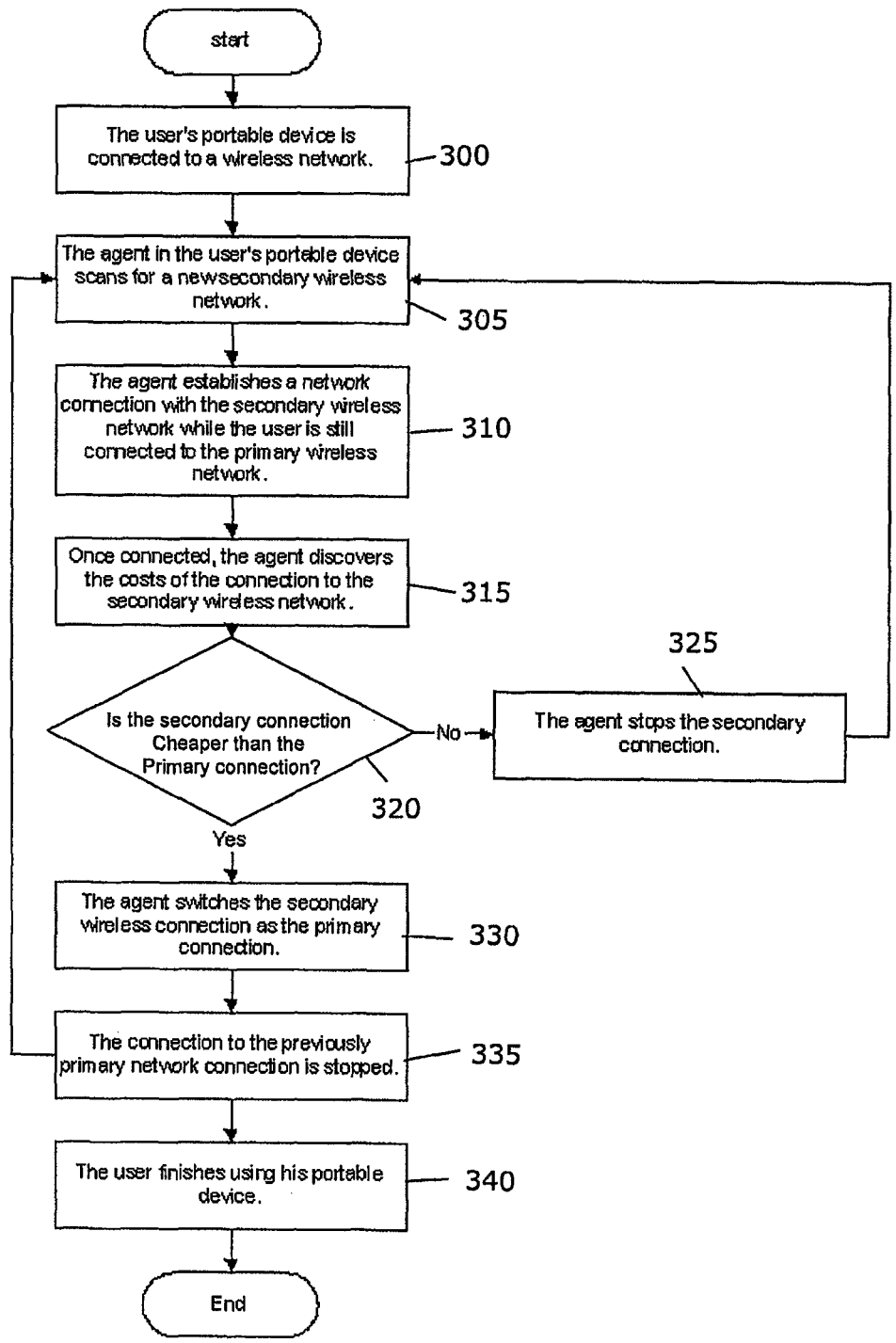
FIG. 3 shows a flow chart of steps for implementing aspects of the invention.

The processes of the flow diagram of FIG. 3 may be implemented in the environment of FIG. 1. The flow diagram of FIG. 3 may equally represent high-level block diagrams of the invention. The processes of the flow diagram may be implemented and executed directly on the user's portable device. Additionally, the invention can take the form of an entirely hardware embodiment, an entirely software embodiment or an embodiment containing both hardware and software elements. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

In FIG. 3, at step 300, the user's portable device is connected to a wireless network. This connection will be the primary connection. In this embodiment, one of the wireless network interface cards (or logical equivalent) is used by the primary connection. At step 305, the agent begins searching (scanning) for a network connection and more preferably a least expensive wireless network connection. For example, the agent scans for a new secondary wireless network that is open to the public, i.e., not encrypted. Alternatively, the new network connection could be encrypted if the device has the appropriate key pre-installed to allow connection to such a network. In embodiments, the scanning for a new network can be performed transparently while the user stays connected on the primary network.

At step 310, a connection will be established or attempted to be established with an available wireless network. The connection can be made automatically without user notification or, alternatively, the user can be provided with notification that a new connection is being examined and made. This notification can be a visual or audio alert such as a "beep", prior to making the actual connection. The connection will be the "secondary connection" which is made while the primary connection is still active. In alternative embodiments, the agent can make several different connections.

At step 315, the agent will discover the cost information about the secondary connection. The agent can also scan the network for other information, such as reliability, etc. At step 320, the agent determines whether the secondary connection is less expensive than the primary network connection. In this processing step, the agent can also or, alternatively, determine whether the secondary network has a user preferred option for connection, e.g., more reliable connection than the primary connection. The process can also allow the user to manually select a network connection from a table or other type of interface.

In embodiments, the agent can make the determination of step 320 by launching a browser transparently with a sample URL. If the browser fails to display the URL, it is not free and/or requires user's registration prior to the usage. From the "splash page," the agent can "screen scrape" the price information from the HTML text using keywords to make a determination of relative cost. Alternatively, the determination of step 315 is made by gathering XML tags showing pricing information in a semantic fashion. This latter alternative is more demanding on the website.

At step 325, if the secondary connection is found to be more expensive than the primary connection, then the agent can disconnect from the secondary connection. The process will then return to step 305. Similarly, in an alternative process, the agent can make a determination as to whether the secondary connection is not as reliable as the primary connection. If this is the situation, the process will also return to step 305. In either of these situations, the connection information can be compared to a history table, as discussed above.

If the secondary connection is less expensive (or more reliable or other user option) than the primary connection, the agent will alert the user that a cheaper wireless connection exists, or the user can authorize the agent, via prior setup and configuration, to act on behalf of the user to proceed with such cheaper connection at step 330. At step 335, the agent will disconnect the first wireless NIC from the primary connection, as the secondary connection is now promoted to be the primary connection. At step 340, the user finishes using the portable device and disconnects from the network.

In contemplated embodiments, if unexplored connections still exist, the agent will continue to search for a cheaper wireless network, by repeating the above steps. If all connections have been explored within a predetermined period of time, e.g., 10 seconds, 20 seconds, etc. then connections will not be rechecked until a threshold time has been met or exceeded, e.g., 1 minute, 2 minutes, etc. Alternatively, all connections may be explored before the switch to the new network is established. This would avoid multiple changes in a static environment, when subsequently cheaper connections are found. The process completes when the agent has explored all available network connections.

While the invention has been described in terms of embodiments, those skilled in the art will recognize that the invention can be practiced with modifications and in the spirit and scope of the appended claims.

What is claimed is:

1. A method for determining whether to connect a wireless device to a secondary wireless network when the wireless device is currently connected to a primary wireless network comprising:
   scanning for available secondary wireless networks;
   establishing a result table set up such that at least one of closest proximity network connections and stronger wireless signals appear in the result table for the available secondary wireless networks in an order from at least one of closest to farthest and strongest to weakest, respectively, wherein the result table includes price listings of the available secondary wireless networks;
   connecting the wireless device with a selected one of the available secondary wireless networks based on which one of the available secondary wireless networks is either closest or strongest while the wireless device is still connected to the primary wireless network;
   determining, after the wireless device has been connected to the selected secondary wireless network, whether the selected secondary wireless network is cheaper than the primary wireless network; and
   determining whether to disconnect the wireless device from the selected secondary wireless network or the primary wireless network based upon a comparison of differences in at least one of price, proximity and signal strength of the selected secondary wireless network and the primary wireless network,
   wherein, after determining whether to disconnect the wireless device from the selected secondary wireless network or the primary wireless network, the wireless device will be connected only to one of the primary wireless network or the selected secondary wireless network, and
   further comprising comparing the available secondary wireless networks to a history table providing data for previously used wireless networks used by the wireless device in the past, and selecting one of the available secondary wireless networks over other available secondary wireless networks if it is listed on the history table,
   wherein the history table includes unique identifiers of the previously used wireless networks, actual connection types of the previously used wireless networks, MAC or IP addresses of the previously used wireless networks, and indications whether the previously used wireless networks are encryption enabled or disabled; and
   the method further comprises:
   checking whether a name of a least expensive previously used wireless network from the history table appears in a list of the available secondary wireless networks found during the scanning;
   when the name of the least expensive previously used wireless network from the history table appears in the list of available secondary wireless networks, selecting the least expensive previously used wireless network from the history table; and
   when the name of the least expensive previously used wireless network from the history table does not appear in the list of available secondary wireless networks, checking whether a name of a next least expensive previously used wireless network from the history table appears in the list of available secondary wireless networks.

2. The method of claim 1, further comprising providing an alert to a user prior to connecting to the selected secondary wireless network.

3. The method of claim 1, wherein the connection to the selected secondary wireless network is automatically established without user notification.

4. The method of claim 1, wherein the connection to the selected secondary wireless network is established after user notification.

5. The method of claim 1, further comprising exploring for further connections to other secondary wireless networks after the connection to the selected secondary wireless network.

6. The method of claim 1, wherein a service provider at least one of creates, maintains, deploys and supports a computer infrastructure that performs the steps of claim 1.

7. The method of claim 6, wherein the computer infrastructure is operable to decrypt the selected secondary wireless network prior to establishing the connection to the selected secondary wireless network.

8. The method of claim 1, wherein the steps of claim 1 are provided on at least one of a subscription, advertising, and a fee basis.

* * * * *